United States Patent
Molina Torres

[19]

[11] Patent Number: 5,892,439
[45] Date of Patent: Apr. 6, 1999

[54] VEHICLE WARNING AND HELP APPARATUS AND METHOD

[76] Inventor: Russell E. Molina Torres, Portón Icabarú 2RN, Avenida Mara, Estado Miranda, Venezuela

[21] Appl. No.: 876,817

[22] Filed: Jun. 16, 1997

[51] Int. Cl.$^6$ ..................................................... B60Q 1/52
[52] U.S. Cl. ........................... 340/471; 340/472; 340/473; 340/474; 340/901; 340/429
[58] Field of Search ................................... 340/471–474, 340/901, 905, 425.5, 429, 436, 438, 440

[56] References Cited

U.S. PATENT DOCUMENTS

| | | | |
|---|---|---|---|
| 4,100,529 | 7/1978 | Evans | 340/901 |
| 4,489,306 | 12/1984 | Scolari | 340/908.1 |
| 4,847,589 | 7/1989 | Dobbins | 340/321 |
| 4,949,067 | 8/1990 | Martell | 340/323 R |

FOREIGN PATENT DOCUMENTS

2640786  6/1990  France .

*Primary Examiner*—Donnie L. Crosland
*Attorney, Agent, or Firm*—Paul S. Rooy

[57] ABSTRACT

A vehicle warning and help apparatus and method comprising a light box electrically and removably connected to a control panel. The light box comprises a red light, yellow light, transceiver, power supply, inertial switch, and momentary contact switch. The control panel comprises a continuous yellow switch backlit when ON by a continuous yellow switch light, a three-flash yellow switch backlit when ON by a three-flash yellow switch light, a red switch backlit when ON by a red switch light, and a horn. In operation, a transmitting vehicle warning and help apparatus sends a signal on a red frequency, a yellow frequency, or both. The transmissions are received by a receiving vehicle warning and help apparatus, and the receiving vehicle warning and help apparatus sounds its horn and illuminates a combination of its continuous yellow switch light, three-flash yellow switch light and red switch light, thus communicating a condition of maximum alert, minimum alert, momentary warning, or official alert. In addition, the momentary contact switch may be used to transmit Morse code messages. The light box is removable from the control panel to permit a distressed motorist to carry the light box with him when seeking help, while the light box continues to transmit help requests and/or Morse code messages, and visual signals.

16 Claims, 6 Drawing Sheets

VEHICLE WARNING AND HELP APPARATUS AND METHOD

BACKGROUND OF THE INVENTION

1. Field of the Invention

This invention relates to warning systems, and in particular to a vehicle warning and help apparatus and method.

2. Background of the Invention

During the past century, motorized vehicles have become the standard in transportation. The most common form of motorized vehicle is the wheeled land vehicle, typically driven by an internal combustion engine. Examples include the automobile, bus, truck, train and motorcycle. The many millions of existent land vehicles get into accidents with statistical regularity, and also encounter hazards along the way. These hazards may include disabled vehicles, poor visibility, elevated drawbridges, emergency vehicles such as ambulances, fire engines and police cruisers travelling at high speeds, and road hazards such as washed-out roads and landslides.

In addition, a statistically predictable number of motorists find themselves in need of aid where their vehicles have been involved in an accident or some other emergency has occurred. Under these circumstances, the motorist may be injured, and it is necessary to summon help quickly. In light of these developments, it has become desirable to provide a vehicle warning and help apparatus and method which is capable not only of warning oncoming motorists of hazards ahead but which is also capable of sending out messages requesting help.

SUMMARY OF THE INVENTION

Accordingly, it is an object of the present invention to provide a vehicle warning and help apparatus and method which activates automatically in case of accident. Design features allowing this object to be accomplished include a light box with transceiver electrically connected to an inertial switch. Advantages associated with the accomplishment of this object include system activation even where a motorist is incapacitated and consequent expedited help.

It is another object of the present invention to provide a vehicle warning and help apparatus and method which is portable. Design features allowing this object to be accomplished include a light box incorporating a red light, a yellow light and a transmitter, which is disconnectable from a control panel. A benefit associated with the accomplishment of this object is the ability of a distressed motorist to leave a distressed vehicle while carrying the portable light box, in order to seek aid while carrying the light box with included transceiver along.

It is still another object of this invention to provide a vehicle warning and help apparatus and method capable of sending Morse code messages. Design features enabling the accomplishment of this object include a momentary contact switch electrically connected with a transceiver. An advantage associated with the realization of this object is the ability to send messages tailored to a specific emergency situation in order to maximize rescue effort efficiency.

It is another object of the present invention to provide a vehicle warning and help apparatus and method which provides visual, radio, and audio signals. Design features allowing this object to be accomplished include a light box containing a yellow light and red light, a transceiver, and a horn. A benefit associated with the accomplishment of this object is increased chance of rescue and/or warning.

It is still another object of this invention to provide a vehicle warning and help apparatus and method capable of warning approaching vehicles of hazards. Design features enabling the accomplishment of this object include a light box containing red and yellow lights and a transceiver, and a control panel with yellow and red annunciator lights and a horn. An advantage associated with the realization of this object is forewarning approaching vehicles of hazards, well in advance.

It is another object of the present invention to provide a vehicle warning and help apparatus and method which permits a vehicle departing a hazard area to warn approaching vehicles. Design features allowing this object to be accomplished include a 3-flash yellow switch and a transceiver. A benefit associated with the accomplishment of this object is flexible warning capability by vehicles passing hazards.

It is still another object of this invention to provide a vehicle warning and help apparatus and method which provides official warning. Design features enabling the accomplishment of this object include a red switch and transceiver. Advantages associated with the realization of this object is the ability of official stations such as police cars, ambulances, fire engines, drawbridge tender stations, etc., to warn oncoming vehicles well in advance of potentially hazardous situations, and simultaneously communicating the official origin of such warning.

BRIEF DESCRIPTION OF THE DRAWINGS

The invention, together with the other objects, features, aspects and advantages thereof will be more clearly understood from the following in conjunction with the accompanying drawings.

Six sheets of drawings are provided. Sheet one contains FIGS. 1 and 2. Sheet two contains FIG. 3. Sheet three contains FIGS. 4, 5 and 6. Sheet four contains FIGS. 7, 8 and 9. Sheet five contains FIGS. 10, 11 and 12. Sheet six contains FIGS. 13, 14 and 15.

DETAILED DESCRIPTION OF THE PREFERRED EMBODIMENT

Figure 3:
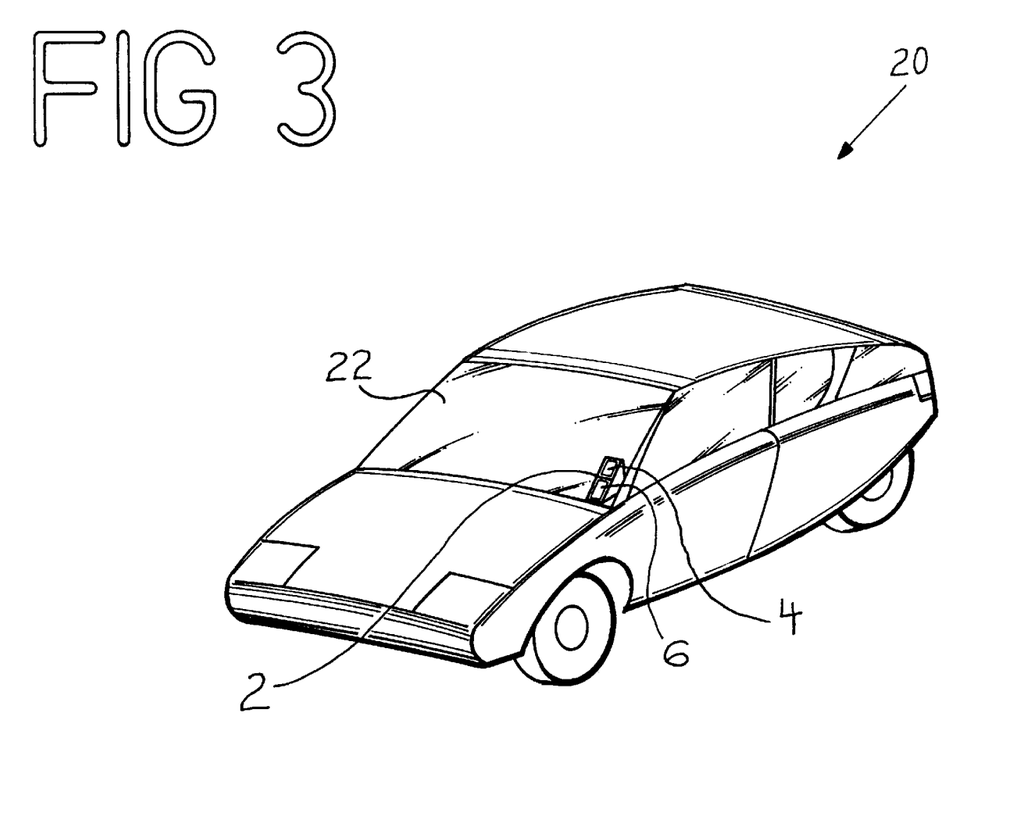
FIG. 3 is a front quarter isometric view of a vehicle equipped with a vehicle warning and help apparatus.

A vehicle warning and help apparatus comprises light box 2 electrically connected to control panel 10. As may be observed in FIG. 3, light box 2 is mounted inside vehicle 20 with its red light 4 and yellow light 6 facing windshield 22, so as to be clearly visible through windshield 22.

Figure 1:
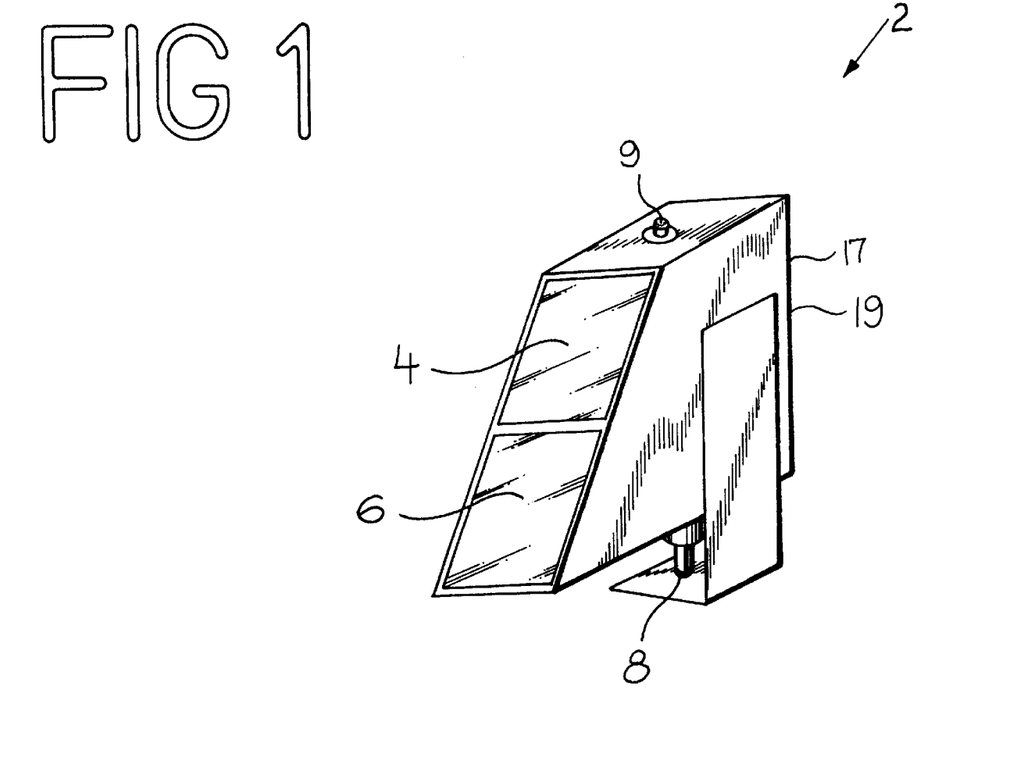
FIG. 1 is a front isometric view of a light box.

FIG. 1 is a front isometric view of light box 2. Light box 2 comprises red light 4, yellow light 6, momentary contact switch 9, inertial switch 8 and horn 26, electrically connected with a power source 17 and a two-frequency transceiver 19, which is capable of transmitting on a red frequency and on a yellow frequency.

Figure 2:
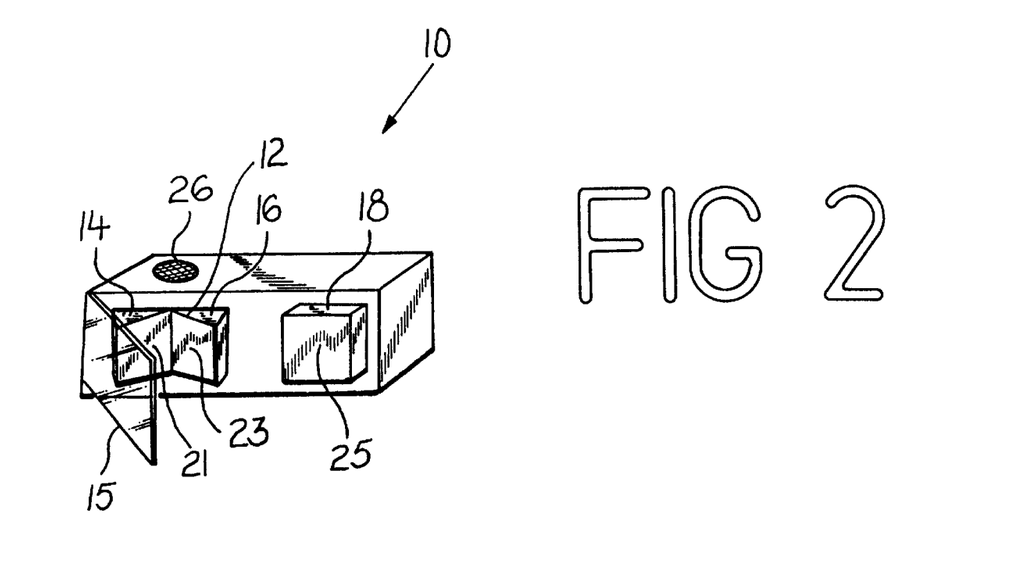
FIG. 2 is a front isometric view of a control panel.

FIG. 2 is a front isometric view of control panel 10. Control panel 10 comprises three-position illuminated rocker switch 12. Rocker switch 12 is normally in a centered, OFF position. Rocker switch 12 may be depressed on one side so as to turn on continuous yellow switch 14 and illuminate continuous yellow switch light 21. Alternately, rocker switch 12 may be depressed on another side so as to turn on three-flash yellow switch 16 and illuminate three-flash yellow switch light 23. A three-flash circuit is electrically connected between three-flash yellow switch 16 and yellow light 6, horn 26, transceiver 19 and three-flash yellow switch light 23. Door 15 may be used to cover rocker switch 12 to prevent inadvertent operation. Control panel 10 is removably electrically connected to light box 2.

A civilian version of control panel 10 further comprises red switch light 25. An official version of control panel 10 further comprises red switch 18 and red switch light 25. When ON, red switch 18 is backlit by red switch light 25.

An added feature which may be incorporated into the vehicle warning and help apparatus is the muting of any vehicle entertainment system sound when any alarm occurs. In this manner, the attention of any affected motorist is directed to the alarm message being received or transmitted.

Effect of Switches

A. Inertial Switch 8

Activation of inertial switch 8 causes maximum alert. During maximum alert, a transmitting station's transceiver 19 transmits on a red frequency and on a yellow frequency, continuous yellow switch light 21, red switch light 25, red light 4 and yellow light 6 flash, and horn 26 sounds. A receiving station's transceiver 19 receives the red frequency and yellow frequency transmissions, and instructs continuous yellow switch light 21 and red switch light 25 to flash, and horn 26 to sound. Activation of inertial switch 8 may be automatic (as in a car crash), or deliberate (where a motorist simply knocks light box 2 off its stand, thus turning on inertial switch 8).

B. Momentary Contact switch 9

Activation of momentary contact switch 9 has a similar effect as a momentary activation of inertial switch 8. The effect lasts only so long as momentary contact switch 9 is depressed. Because momentary contact switch 9 is normally OFF, momentary contact switch 9 is ON only so long as it is depressed. When released, momentary contact switch 9 returns to its normally OFF position.

When momentary contact switch 9 is depressed, a transmitting station's transceiver 19 transmits on a red frequency and on a yellow frequency, continuous yellow switch light 21, red switch light 25, red light 4 and yellow light 6 illuminate continuously, and horn 26 sounds. A receiving station's transceiver 19 receives the red frequency and yellow frequency transmissions, and instructs continuous yellow switch light 21 and red switch light 25 to illuminate continuously, and horn 26 to sound, so long as momentary contact switch 9 is depressed.

Momentary contact switch 9 may be used to send coded messages to other stations. One code thus used may be Morse code. In this manner, a distressed station may send specific messages to rescue stations, such as the location of the distressed station and the medical condition of motorist and passengers.

C. Continuous yellow switch 14

Activation of continuous yellow switch 14 causes minimum alert. During minimum alert, a transmitting station's transceiver transmits on a yellow frequency, continuous yellow switch light 21 and yellow light 6 flash, and horn 26 sounds. A receiving station's transceiver 19 receives the yellow frequency transmissions and instructs continuous yellow switch light 21 to flash and horn 26 to sound.

D. Three-flash Yellow Switch 16

Activation of three-flash yellow switch 16 causes a short, three-pulse warning signal. During warning signal, three-flash yellow switch 16 (which is electrically connected to a three-flash circuit) is depressed. The three-flash circuit instructs a transmitting station's transceiver 19 to transmit three signals on a yellow frequency only, continuous yellow switch light 21 and yellow light 6 to flash three times only, and horn 26 simultaneously to sound three times only. A receiving station's transceiver 19 receives the three signals on the yellow frequency, and instructs continuous yellow switch light 21 to flash three times only and horn 26 to simultaneously sound three times only.

E. Red Switch 18 (Available on official stations only)

Activation of red switch 18 causes official alert. During official alert, a transmitting station's transceiver 19 transmits on a red frequency, red switch light 25 and red light 4 illuminate, and horn 26 sounds. A receiving station's transceiver 19 receives the red frequency transmissions and instructs switch light 25 to illuminate and horn 26 to sound. Note that activation of red switch 18 may be effectuated by official stations only, because civilian versions of the vehicle warning and help apparatus do not include red switch 18.

Description of Alert Situations

A. Maximum Alert

Figures 4, 5, 6:
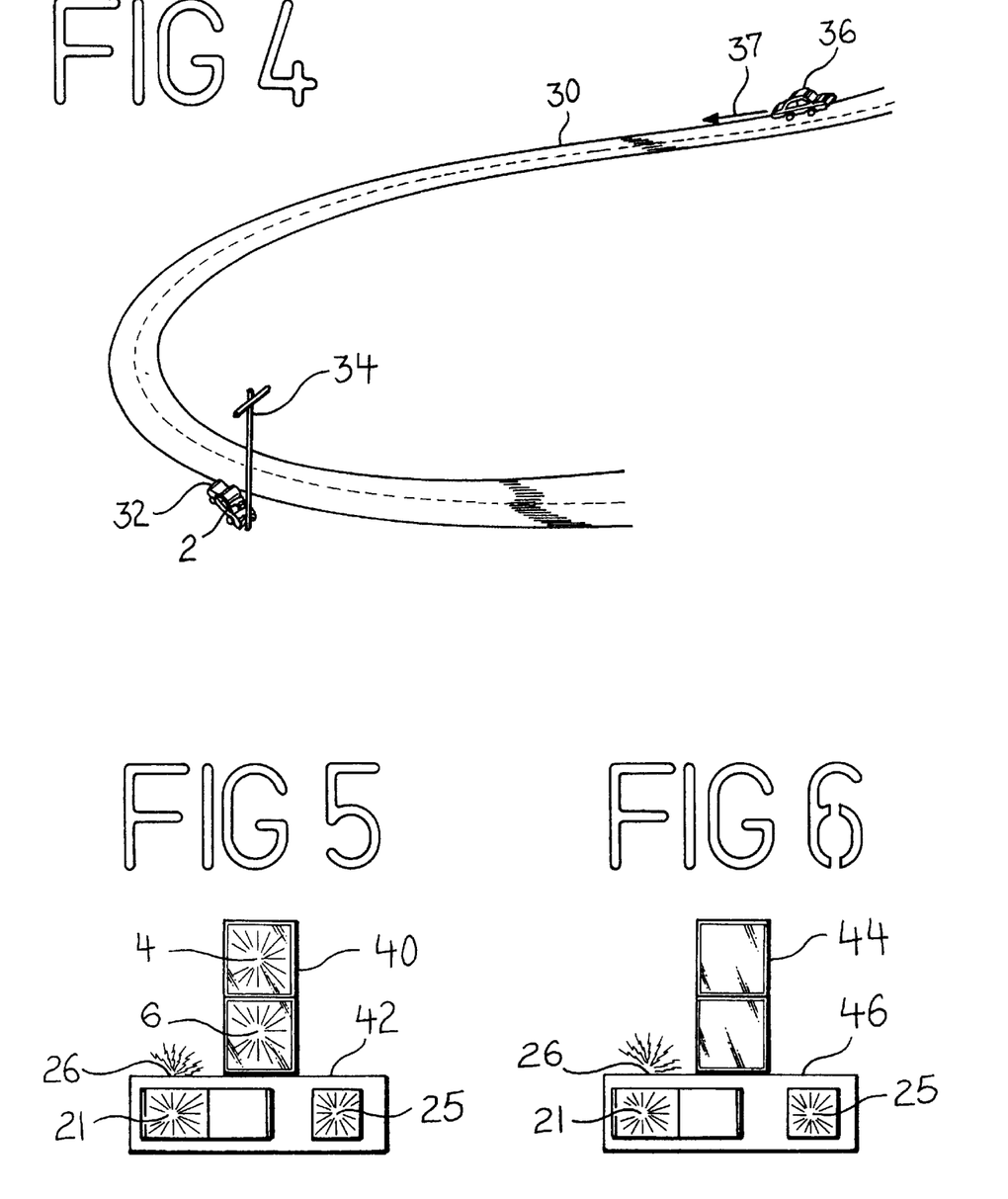
FIG. 4 is an elevated isometric view of a maximum alert situation.
FIG. 5 is a front view of an accident vehicle light box and control panel during a maximum alert.
FIG. 6 is a front view of an approaching vehicle light box and control panel during a maximum alert.

FIGS. 4–6 depict a maximum alert situation. A maximum alert is intended to provide the most vivid communication to receiving stations of an emergency which has occurred. One typical example of a maximum alert situation would be where one or more vehicles have collided, and inertial switch 8 has automatically turned ON. Another example would be where a motorist has experienced some type of emergency, and has manually turned on inertial switch 8.

FIG. 4 shows an accident vehicle 32 which has collided with electric pole 34, and approaching vehicle 36 travelling toward the accident location on road 30 as indicated by arrow 37. When accident vehicle 32 collided with electric pole 34, inertial switch 8 automatically initiated a maximum alert. FIG. 5 illustrates accident vehicle light box 40 and accident vehicle control panel 42. During maximum alert, accident vehicle 32's continuous yellow switch light 21, red switch light 25, red light 4 and yellow light 6 flash, horn 26 sounds, and transceiver 19 transmits on a red frequency and on a yellow frequency.

FIG. 6 illustrates approaching vehicle light box 44 and approaching vehicle control panel 46. During maximum alert, approaching vehicle 36's transceiver receives the red and yellow frequency transmissions, and instructs continuous yellow switch light 21 and red switch light 25 to flash, and horn 26 to sound, thus alerting approaching vehicle 36 of an emergency ahead. Transceiver 19 is set to communicate with approaching vehicle 36 within a radius of approximately 1 kilometer, thereby affording relatively precise geographic location information, and reducing frequency congestion.

B. Minimum Alert

Figure 7:
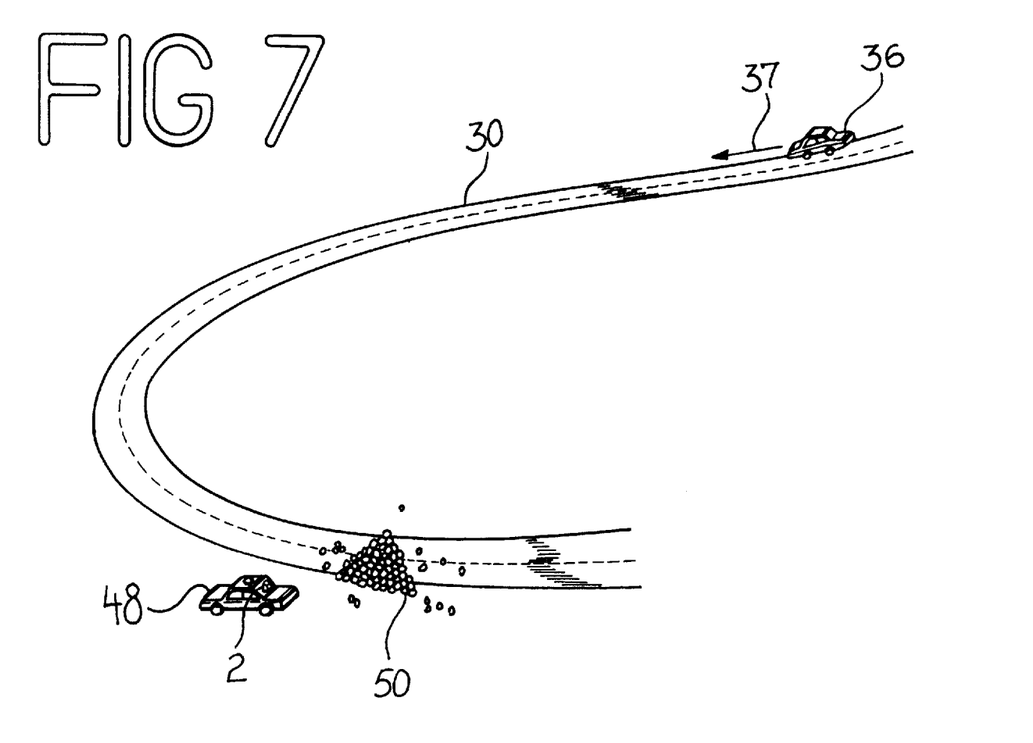
FIG. 7 is an elevated isometric view of a minimum alert situation.
Figure 8:
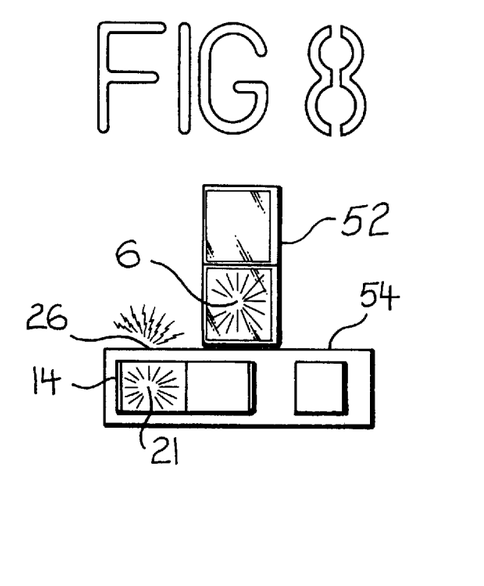
FIG. 8 is a front view of an warning vehicle light box and control panel during a minimum alert.
Figure 9:
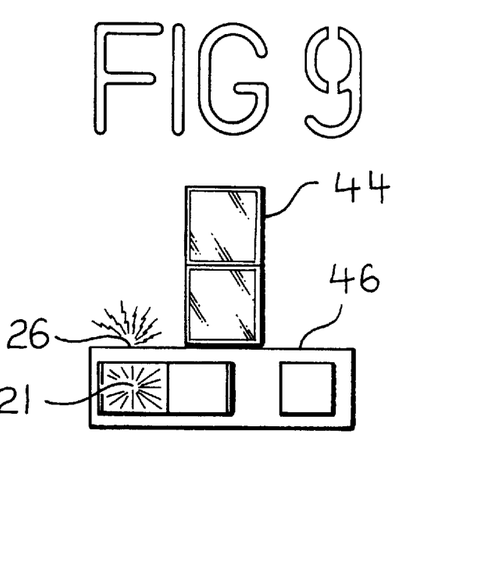
FIG. 9 is a front view of an approaching vehicle light box and control panel during a minimum alert.

FIGS. 7–9 depict a minimum alert situation. A minimum alert is intended to provide a moderate warning of potential hazards ahead. One typical example of a minimum alert situation would be where a road has been washed out, or a landslide has created a possibly dangerous situation.

FIG. 7 shows a landslide 50 which has partially covered road 30, and approaching vehicle 36 travelling as indicated by arrow 37. Warning vehicle 48 is located at the danger site, and is sending minimum alert signals to other vehicles in the proximity to warn them of landslide 50. Warning vehicle 48 initiates the minimum alert by depressing continuous yellow switch 14.

FIG. 8 illustrates warning vehicle light box 52 and warning vehicle control panel 54. During minimum alert, warning vehicle 52's transceiver 19 transmits on a yellow frequency, continuous yellow switch light 21 and yellow light 6 flash, and horn 26 sounds.

FIG. 9 illustrates approaching vehicle light box 44 and approaching vehicle control panel 46. During minimum alert, approaching vehicle 36's transceiver receives yellow frequency transmission, and instructs continuous yellow switch light 21 to flash and horn to 26 sound, thus alerting approaching vehicle 36 of a potential hazard ahead. Transceiver 19 is set to communicate with approaching vehicle 36 within a radius of approximately 1 kilometer, thereby affording relatively precise geographic location information, and reducing frequency congestion.

C. Momentary Warning

Figure 10:
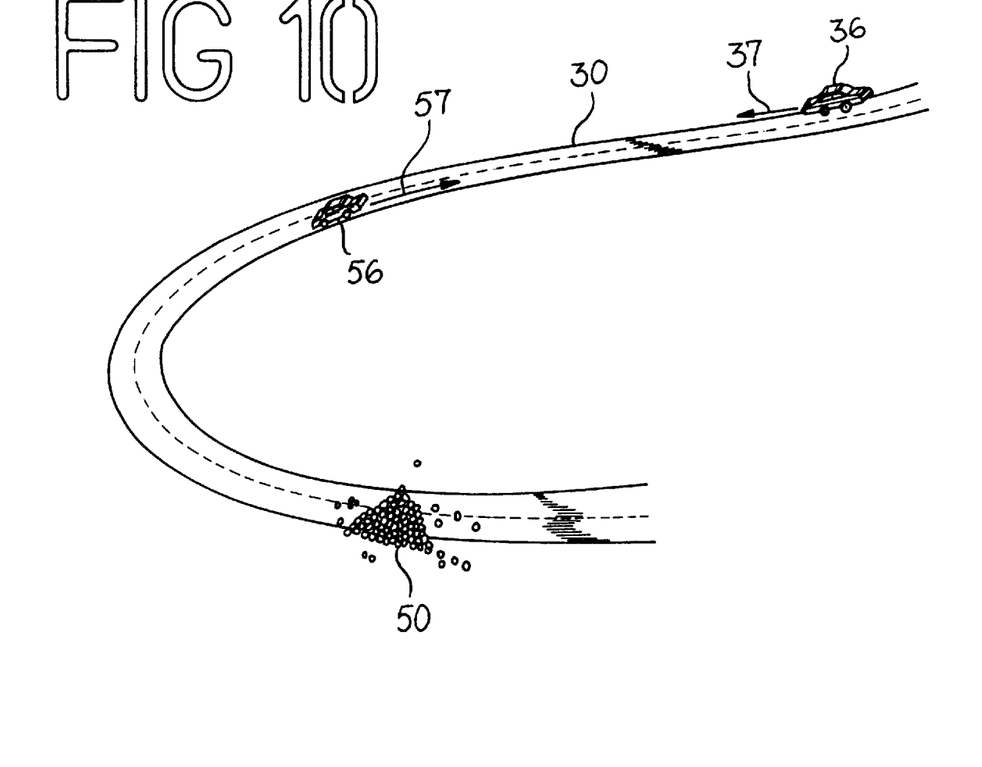
FIG. 10 is an elevated isometric view of a departing vehicle warning an approaching vehicle.
Figure 11:
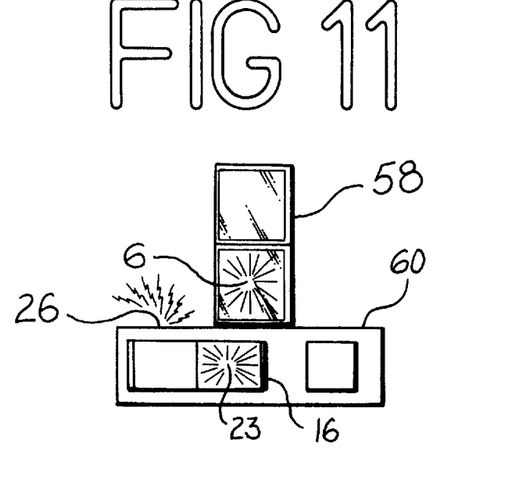
FIG. 11 is a front view of a departing vehicle light box and control panel during warning by a departing vehicle.
Figure 12:
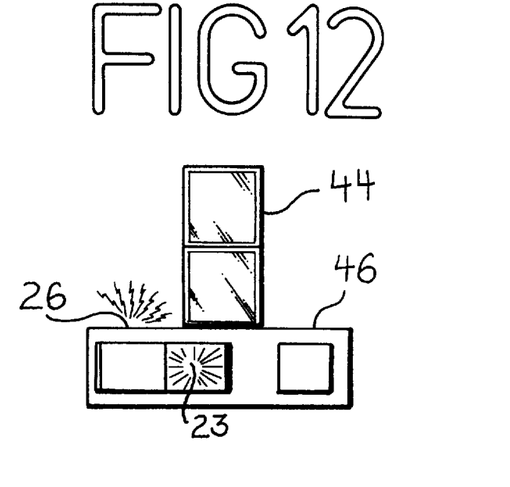
FIG. 12 is a front view of an approaching vehicle light box and control panel during warning by a departing vehicle.

FIGS. 10–12 depict a momentary warning situation. A momentary warning is intended to provide an opportunity for a departing vehicle 56 to give a short, moderate warning to an approaching vehicle 36 of potential hazards ahead. One typical example of a minimum alert situation would be where a road has been washed out, or a landslide has created a possibly dangerous situation.

FIG. 10 shows a landslide 50 which has partially covered road 30, departing vehicle 56 exiting the landslide 50 area as indicated by arrow 57, and approaching vehicle 36 drawing nearer the landslide 50 area as indicated by arrow 37. Departing vehicle 56 initiates the momentary warning by depressing three-flash yellow switch 16.

FIG. 11 illustrates departing vehicle light box 58 and departing vehicle control panel 60. During momentary warning, departing vehicle 56's transceiver 19 transmits on a yellow frequency, three-flash yellow switch light 23 and yellow light 6 flash three times only, and horn 26 simultaneously sounds three times only.

FIG. 12 illustrates approaching vehicle light box 44 and approaching vehicle control panel 46. During momentary warning, approaching vehicle 36's transceiver receives the yellow frequency transmission, and instructs three-flash yellow switch light 23 to flash three times only, and horn 26 simultaneously to sound three times only, thus alerting approaching vehicle 36 of a potential hazard ahead. Transceiver 19 is set to communicate with approaching vehicle 36 within a radius of approximately 1 kilometer, thereby affording relatively precise geographic location information, and reducing frequency congestion.

D. Official Use (May be initiated by official stations only)

Figure 13:
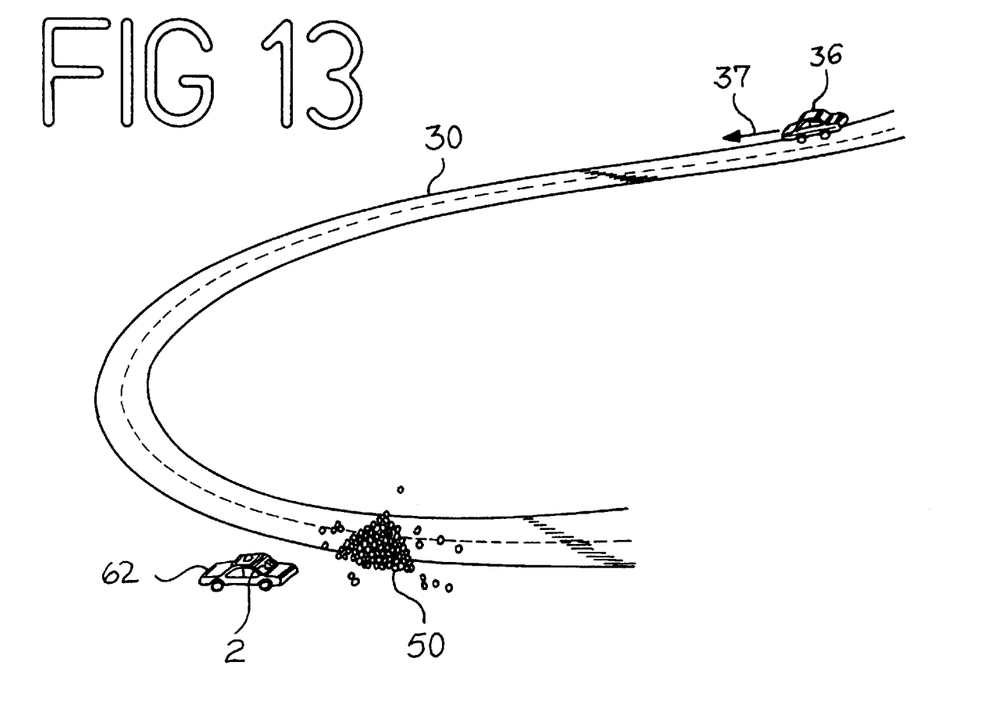
FIG. 13 is an elevated isometric view of an official alert situation.
Figure 14:
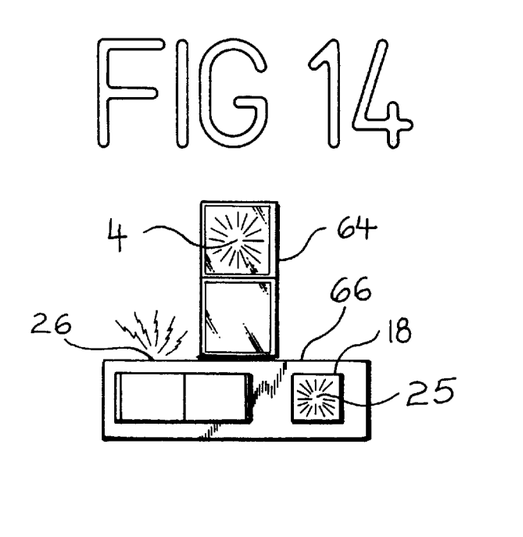
FIG. 14 is a front view of an official station light box and control panel during an official alert situation.
Figure 15:
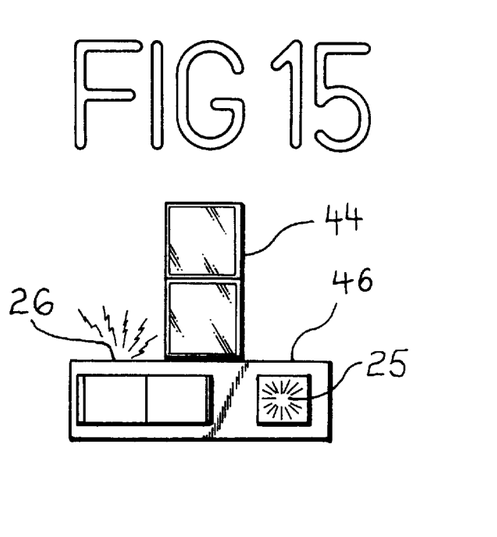
FIG. 15 is a front view of an approaching vehicle light box and control panel during an official warning situation.

FIGS. 13–15 depict an official warning situation. An official warning can be initiated by official stations only, such as may be located on police vehicles, fire engines, ambulances, drawbridge stations, etc. Official warnings are intended to alert motorists of alert or hazard situations associated with official activities, such as emergency vehicle movements and traffic control functions.

FIG. 13 shows a landslide 50 which has partially covered road 30, official station 62 disposed in the landslide 50 area, and approaching vehicle 36 travelling toward the landslide 50 area as indicated by arrow 37. Official station 62 initiates the official warning by depressing red switch 18.

FIG. 14 illustrates official station light box 64 and official station control panel 66. During official warning, official station 62's transceiver transmits on a red frequency, red switch light 25 and red light 4 light continuously and horn 26 sounds. FIG. 15 illustrates approaching vehicle light box 44 and approaching vehicle control panel 46. During official warning, approaching vehicle 36's transceiver receives the red frequency transmission, and instructs red switch light 25 to light continuously and horn to 26 sound, thus alerting approaching vehicle 36 of a potential hazard or alert of an official nature ahead. Transceiver 19 is set to communicate with approaching vehicle 36 within a radius of approximately 1 kilometer, thereby affording relatively precise geographic location information, and reducing frequency congestion.

E. Remote Operation

Light box 2 is removably electrically connected to control panel 10. Thus, light box 2 may simply be unplugged from control panel 10 and taken along with a motorist abandoning his vehicle. In this fashion, a motorist may try to walk to find help, while still broadcasting his approximate location and his distress signal.

F. Morse Code Operation

Light box 2 comprises momentary contact switch 9, which has a similar effect as a momentary activation of inertial switch 8. The effect lasts only so long as momentary contact switch 9 is depressed. Because momentary contact switch 9 is normally OFF, momentary contact switch 9 is ON only so long as it is depressed. When released, momentary contact switch 9 returns to its normally OFF position.

When momentary contact switch 9 is depressed, a transmitting station's transceiver transmits on a red frequency and on a yellow frequency, continuous yellow switch light 21, red switch light 25, red light 4 and yellow light 6 illuminate continuously, and horn 26 sounds. A receiving station's transceiver receives the red and yellow frequency transmissions, and instructs continuous yellow switch light 21 and red switch light 25 illuminate continuously, and horn 26 sounds, so long as momentary contact switch 9 is depressed.

Momentary contact switch 9 may be used to send coded messages to other stations. One code thus used may be Morse code. In this manner, a distressed station may send specific messages to rescue stations, such as the location of the distressed station and the medical condition of motorist and passengers.

In the preferred embodiment, red light 4 and yellow light 6 were standard high-intensity lamps of appropriate voltage to be powered by a power source 17 such as a rechargeable battery. Inertial switch 8, momentary contact switch 9, three-position lit rocker switch 12, red switch light 25 and red switch 18 were standard electrical contactors such as are currently used on land vehicles, boats or aircraft. Transceiver 19 was a low-power, commercially available short range radio capable of simultaneously transmitting on two frequencies (a red and a yellow frequency). Horn 26 was a commercially available low voltage sound device.

While a preferred embodiment of the invention has been illustrated herein, it is to be understood that changes and variations may be made by those skilled in the art without departing from the spirit of the appending claims.

DRAWING ITEM INDEX 2 light box
4 red light
6 yellow light
8 inertial switch
9 momentary contact switch
10 control panel
12 rocker switch
14 continuous yellow switch
15 door
16 three-flash yellow switch
17 power source
18 red switch
19 transceiver
20 vehicle
21 continuous yellow switch light
22 windshield
23 three-flash yellow switch light
25 red switch light
26 horn
30 road
32 accident vehicle
34 electric pole
36 approaching vehicle
37 arrow
40 accident vehicle light box
42 accident vehicle control panel
44 approaching vehicle light box
46 approaching vehicle control panel
48 warning vehicle
50 landslide
52 warning vehicle light box
54 warning vehicle control panel
56 departing vehicle
57 arrow
58 departing vehicle light box
60 departing vehicle control panel
62 official station
64 official station light box
66 official station control panel

I claim:

1. A vehicle warning and help apparatus comprising light box electrically connected to a control panel, said light box comprising at least one light electrically connected to a power source through an inertial switch, and a transceiver electrically connected to said power source, said control panel comprising a rocker switch and a red switch light electrically connected to said light box, whereby activation of said inertial switch or said rocker switch causes said transceiver to transmit and said at least one light to illuminate.

2. The vehicle warning and help apparatus of claim 1 wherein said rocker switch is a three-position switch comprising a continuous yellow switch and a three-flash yellow switch, said continuous yellow switch being backlit with a continuous yellow switch light when ON, said three-flash yellow switch being backlit with a three-flash yellow switch light when ON.

3. The vehicle warning and help apparatus of claim 2 wherein said light box further comprises a horn electrically connected to said rocker switch and said red switch.

4. The vehicle warning and help apparatus of claim 3 wherein the said light box is removably connected to said control panel.

5. The vehicle warning and help apparatus of claim 4 wherein said transceiver is a two-channel transceiver capable of transmitting on a red frequency and on a yellow frequency, and wherein said light box comprises a red light and a yellow light, whereby in a transmitting vehicle warning and help apparatus when said inertial switch is ON, said red light, said yellow light, said continuous yellow switch light and said red switch light flash, said horn sounds, and said transceiver transmits on said red and yellow frequencies, and in a receiving vehicle warning and help apparatus a receiving transmitter receives the red and yellow transmissions, and instructs a continuous yellow switch light and a red switch light to flash, and a horn to sound.

6. The vehicle warning and help apparatus of claim 5 wherein said light box further comprises a momentary contact switch electrically connected to said transceiver, said red light, said yellow light, and to said control panel, whereby in a transmitting vehicle warning and help apparatus depressing said momentary contact switch causes said red light, said yellow light, said horn, said continuous yellow switch light, said red switch light to turn ON and said transceiver to transmit on a red frequency and on a yellow frequency, and in a receiving vehicle warning and help apparatus a receiving transceiver receives said red and yellow frequency transmission, and instructs a horn, a continuous yellow switch light and a red switch light to turn ON, so long as said momentary contact switch remains depressed, whereby Morse code messages may be communicated.

7. The vehicle warning and help apparatus of claim 6 wherein said three-flash yellow switch is electrically connected to a three-flash circuit whereby, in a transmitting vehicle warning and help apparatus the act of depressing said three-flash yellow switch causes said yellow light and said three-flash yellow switch light to flash three times, and said horn to simultaneously sound three times and said transceiver to transmit three signals on said yellow frequency, and in a receiving vehicle warning and help apparatus a transceiver receives the three yellow transmissions and instructs a three-flash yellow switch light to flash three times, and a horn to simultaneously sound three times.

8. The vehicle warning and help apparatus of claim 7 wherein said vehicle warning and help apparatus is an official vehicle warning and help apparatus comprising a red switch electrically connected to said light box, to said transceiver and to said horn, whereby in a transmitting official vehicle warning and help apparatus depressing said red switch causes said red switch light and said red light to illuminate, and said transceiver to transmit on a red frequency, and in a receiving vehicle warning and help apparatus a transceiver to receive the red frequency transmission and instruct a red switch light to illuminate and a to horn sound.

9. The vehicle warning and help apparatus of claim 7 wherein said continuous yellow switch light is electrically connected to said horn, said transceiver and said yellow light, whereby in a transmitting vehicle warning and help apparatus depressing said continuous yellow light switch causes said yellow light and said continuous yellow switch light to flash, said horn to sound and said transceiver to transmit on said yellow frequency, and in a receiving vehicle warning and help apparatus, a receiving transceiver receives the yellow transmission, and instructs a continuous yellow switch light to flash and a horn to sound.

10. A vehicle warning and help method comprising the steps of:
   A. Providing a light box comprising a red light, a yellow light, a horn, and a transceiver electrically connected to a power source through an inertial switch; and a control panel electrically connected to said light box, said control panel comprising a continuous yellow switch backlit when ON by a continuous yellow switch light, a three-flash yellow switch backlit when ON by a three-flash yellow switch light, and a red switch light;
   B. in a transmitting vehicle, turning ON said inertial switch, thereby causing said red light, said yellow light, said continuous yellow switch light and said red switch light to flash and said horn to sound, and said transceiver to transmit on a red frequency and on a yellow frequency; and
   C. in a receiving vehicle, receiving said red frequency and said yellow frequency transmissions by a transceiver, thereby causing a continuous yellow switch light and a red switch light to flash and a horn to sound, thereby alerting a motorist observing said receiving vehicle warning and help apparatus of possible danger ahead.

11. The vehicle warning and help method of claim 10 comprising the alternate steps of:
   in a transmitting vehicle, turning ON said continuous yellow switch, thereby causing said yellow light and said continuous yellow switch light to flash and said horn to sound, and said transceiver to transmit on a yellow frequency; and
   in a receiving vehicle, receiving said yellow frequency transmission by a transceiver, thereby causing a continuous yellow switch light to flash and a horn to sound, thereby alerting a motorist observing said receiving vehicle warning and help apparatus of possible danger ahead.

12. The vehicle warning and help method of claim 10 comprising the alternate steps of:
   providing a three-flash circuit electrically connected to said red light, said yellow light, said three-flash yellow switch, said three-flash yellow switch and said horn;
   in a transmitting vehicle, turning ON said three-flash yellow switch, thereby causing said yellow light and said continuous yellow switch light to flash three times only and said horn to simultaneously sound three times only, and said transceiver to transmit on a yellow frequency; and
   in a receiving vehicle, receiving said yellow frequency transmission by a transceiver, thereby causing a three-flash yellow switch light to flash three times only and a horn to simultaneously sound three times only, thereby alerting a motorist observing said receiving vehicle warning and help apparatus of possible danger ahead.

13. The vehicle warning and help method of claim 10 comprising the alternate steps of:
   providing a red switch electrically connected to said red light and said transceiver;
   in a transmitting vehicle, turning ON said red switch, thereby causing said red light and said red switch light to illuminate and said horn to sound, and said transceiver to transmit on a red frequency; and
   in a receiving vehicle, receiving said red frequency transmission by a transceiver, thereby causing a red switch light to illuminate and a horn to sound, thereby alerting a motorist observing said receiving vehicle warning and help apparatus of possible danger ahead.

14. The vehicle warning and help method of claim 10 comprising the alternate steps of:
   providing a momentary contact switch electrically connected to said red light, said yellow light, said continuous yellow light, said red switch light, said horn and said transceiver;
   in a transmitting vehicle, turning ON said momentary contact switch, thereby causing said red light, said yellow light, said continuous yellow switch light and said red switch light to illuminate said horn to sound, and said transceiver to transmit on a red frequency and on a yellow frequency, so long as said momentary contact switch is ON; and
   in a receiving vehicle, receiving said red frequency and said yellow frequency transmissions by a transceiver, thereby causing a continuous yellow switch light and a red switch light to illuminate and a horn to sound so long as said momentary contact switch is ON, thereby permitting a Morse code message to be communicated.

15. The vehicle warning and help method of claim 10 comprising the additional steps of:
   providing a removable electrical connection between said light box and said control panel; and
   disconnecting said light box from said control panel, and carrying said light box away from a distressed vehicle in order to seek help.

16. The vehicle warning and help method of claim 14 comprising the additional steps of:
   providing a removable electrical connection between said light box and said control panel; and
   disconnecting said light box from said control panel, and carrying said light box away from a distressed vehicle in order to seek help.

* * * * *

UNITED STATES PATENT AND TRADEMARK OFFICE
CERTIFICATE OF CORRECTION

PATENT NO.    : 5,892,439                                              Page 1 of 1
DATED         : April 6, 1999
INVENTOR(S)   : Russell M. Torres It is certified that error appears in the above-identified patent and that said Letters Patent is hereby corrected as shown below:

Column 1,
Line 14, "...motorcycle. The many ..." should be -- ...motorcycle. *[new paragraph]* The many... --
Line 26, "...quickly. In light..." should be -- ...quickly.*[new paragraph]*     In light... --

Column 8,
Line 14, "...apparatus a receiving..." -- should be apparatus, a receiving... --

Column 10,
Line 25, "...illuminate said horn to..." should be -- ...illuminate, said horn to... --

Signed and Sealed this

Eleventh Day of March, 2003

JAMES E. ROGAN
*Director of the United States Patent and Trademark Office*